United States Patent [19]

Cejkova et al.

[11] Patent Number: 5,607,688
[45] Date of Patent: Mar. 4, 1997

[54] CONTACT LENS OF HYDROPHILIC GELS WITH INHIBITOR AND SWELLING AGENT

[76] Inventors: Jitka Cejkova, 102 11 Praha 10, V Novem Hostivati 21; Jiri Vacik, 140 00 Praha 4, Mechanicka 18/2560, both of Czechoslovakia

[21] Appl. No.: 370,473

[22] Filed: Jan. 9, 1995

Related U.S. Application Data

[63] Continuation of Ser. No. 34,177, Mar. 19, 1993, abandoned, which is a continuation of Ser. No. 588,360, Sep. 26, 1990, abandoned.

[30] Foreign Application Priority Data

Sep. 26, 1989 [CZ] Czech Rep. .............................. 5464-89

[51] Int. Cl.$^6$ ........................................... A61K 9/00
[52] U.S. Cl. .......................... 424/429; 523/106; 514/839
[58] Field of Search ........................... 523/106; 514/839; 424/429

[56] References Cited

U.S. PATENT DOCUMENTS

| | | | |
|---|---|---|---|
| 4,703,108 | 10/1987 | Silver et al. | 530/356 |
| 4,931,279 | 6/1990 | Bawa et al. | 424/427 |
| 4,939,135 | 7/1990 | Robertson et al. | 514/179 |
| 5,202,118 | 4/1993 | Gillis et al. | 424/85.2 |

OTHER PUBLICATIONS

USPDI—1989 pp. 2449/1356 Indomethnacin.

USP 1989 Nineth edition, pp. 2449; 1356.

*Primary Examiner*—Neil S. Levy
*Attorney, Agent, or Firm*—Notaro & Michalos P.C.

[57] ABSTRACT

The contact lens made of hydrophilic gels contains substantially 20 to 65 percent by weight of a swelling agent in the equilibrium swollen state. An example of the swelling agent can be physiological saline, water, or buffer with pH 6.5 to 7.5. The lens contains inhibitors of endoproteases and exoproteases such as aprotinin, elastatinal, and soybean. The lens may also include some type of steroidal and/or nonsteroidal antiphlogistics. The lens may also contain antibiotics. The contact lens is used for longer term wearing and may also be used for the treatment of various lesions of the anterior eye segment.

1 Claim, No Drawings

5,607,688

CONTACT LENS OF HYDROPHILIC GELS WITH INHIBITOR AND SWELLING AGENT

This application is a continuation of U.S. patent application Ser. No. 08/034,177, filed Mar. 19, 1993, which itself was a continuation of U.S. patent application Ser. No. 07/588,360, filed Sep. 26, 1990, both prior applications now abandoned.

FIELD AND BACKGROUND OF THE INVENTION

Applicants claim priority based upon Czechoslovakian patent application number PV 5464-89 filed on Sep. 26, 1989.

This invention relates generally to a contact lens made of a hydophilic gel and more particularly to a contact lens made of a hydrophilic gel containing 20 to 95 percent by weight of a swelling agent in the state of equilibrium swelling.

It will be appreciated by those skilled in the art that contact lenses should interfere as little as possible with the normal metabolism of the anterior eye segment, and particularly with the metabolism of the cornea. This minimal interference will extend the time for wearing the lens, without danger of unfavorable consequences for the eye tissues. Many such attempts have been made to serve this purpose.

British Patent No. 1,495,043 is one such attempt. This patent discloses a contact lens made of strongly swollen hydrophilic gels through which oxygen and low-molecular weight water-soluble metabolites diffuse relatively easily. However, very soft contact lenses with a high content of water at the equilibrium swelling at 20° C. (e.g., 60 to 85 percent of water) have low strength and are easily damaged during handling. The refractive index of the lens also decreases rapidly with increasing content by water, so that the lenses with higher dioptric values have to be thicker. In addition, the more water the lens contains, the more the lens dries and absorbs water from the cornea upon application, which may cause a change in refraction, curvature of the cornea, and the like.

What is needed, then, is a contact lens which minimizes interference with the metabolism of the anterior eye segment. This contact lens must also extend the period it can be worn and have improved strength while having high water content. This lens is presently lacking in the prior art.

SUMMARY OF THE INVENTION

The present invention comprises a contact lens of hydrophilic gels, containing 20 to 95 percent by weight of a swelling agent in the state of equilibrium swelling. This lens contains 0.1 to 20 mg. of an inhibitor of endoproteases and exoproteases per one milliliter of the swelling agent. This lens can also contain antibiotics and antiphlogistics (e.g. an anti-inflammatory medicine).

Accordingly, an object of the present invention is to provide a contact lens that minimizes interference with the metabolism of the anterior eye segment.

Still another object of the present invention is to extend the wearing period of a contact lens.

Yet another object of the present invention is to improve the strength of a contact lens with high water content.

DETAILED DESCRIPTION

The preferred embodiment of the present invention is a contact lens made of hydrophilic gels, containing 20 to 95 percent by weight of a swelling agent in the state of equilibrium swelling. This swelling agent may be any material such as physiological saline, water, or buffer with pH 6.5 to 7.5 (preferably an ionically balanced phosphate or borax buffer). This lens contains 0.1 to 20 mg. of inhibitors of endoproteases and exoproteases per one milliliter of the swelling agent. These inhibitors are such materials as aprotinin, elastatinal, and soybean inhibitor of trypsine. One (1) mg. of aprotinin contains approximately 5,000 trypsine inhibiting units (TIU).

The inhibitors of endoproteases and exoproteases are present in the contact lens and are released from the lens after application. The incorporation of inhibitors into the lens may be carried out by: (a) conditioning the contact lens in the xerogel state in a solution of inhibitors; (b) drying the commercially produced hydrophilic contact lens and conditioning it in a solution with the inhibitors; or (3) polymerization incorporation.

The conditioning of the contact lens in the solution of inhibitors is repeated several times in order to achieve approximately the same concentration of inhibitors in the lens as exists in the solution. The drying of a contact lens may be carried out by the method described in Czechoslovak Patent No. 254,382 (British Patent No. 2,180,243).

The incorporation of inhibitors by polymerization into the structure of the contact lens can be carried out by low temperature polymerization (below 50° C.) or by polymerization with UV radiation, provided that these inhibitors are soluble in the monomer mixture. The choice of these initiation systems may be explained by the possible denaturation of inhibitors if high-temperature initiation systems are used.

The first symptoms of incompatibility of the contact lens in an eye is accompanied by the occurrence of plasmin and other serin proteases in tears and later on the surface of the cornea and conjunctiva. Further changes in the eye are caused by the increased amount of destructive enzymes such as proteolytic enzymes in tears and eye tissues which locally cause degenerative processes.

The inhibitors of endoproteases and exoproteases, which are in the contact lens of the present invention and which are released from the lens during application, inhibit plasmin and other destructive enzymes and thus increase the compatibility of contact lenses and extend the time they can be worn. At the same time, the period of extended wear depends on the degree of contact lens hydration and thickness.

In order to maintain an efficient concentration of inhibitors in the contact lens, it is necessary to keep the lens in a physiological saline buffer with pH 6.5 to 7.5 such as the ionically balanced phosphate or borax buffer, or in water containing the inhibitors disclosed herein in the given amount.

The contact lens of the preferred embodiment may contain 0.05 to 1.5 percent by weight of steroidal antiphlogistics such as dexamethasone and/or 0.05 to 5 percent by weight of non-steroidal antiphlogistics such as indomethacin. In the preferred embodiment, the contact lens also has 0.2 to 1 percent by weight of antibiotics sensitive to microbes such as chloramphenicol, neomycin, tetracycline, and the like.

The antibiotics and antiphlogistics are introduced into the contact lens by being dissolved in the swelling agent together with inhibitor.

The antiphlogistics and antibiotics are released from the contact lens into the eye gradually, depending on their molecular weight, for 12 to 24 hours. After this time elapses, the contact lens is inserted into the solution mentioned above for 10 to 14 hours and again applied to the eye.

The combination of inhibitors of endoproteases and exoproteases with antiphlogistics and antibiotics leads to an enhanced antiexudation, antiinflammatory, and antimicrobial effect and a reduced time of treatment at lower concentrations of antiphlogistics and antibiotics.

The present contact lens is not subject to the deposition of mucus and other deposits. The eye with the applied lens has no pathogenic microbes.

The contact lens of the preferred embodiment is used particularly for extended wearing. It may be successfully used also for the treatment of various lesions of the anterior segment of the eye both by application to the contact lens or by instillation of therapeutic solutions through the contact lens.

The invention is further illustrated in the examples of performance. Polymacon is a crosslinked poly (2-hydroxyethyl methacrylate). Vifilcon is a crosslinked copolymer of 2-hydroxyethyl methacrylate with vinylpyrrolidone and methacrylic acid. Deltafilcon is a crosslinked copolymer of 2-hydroxyethyl methacrylate with methyl methacrylate. Ocufilcon is a crosslinked copolymer of 2-hydroxyethyl methacrylate with methacrylic acid. Hefilcon is a crosslinked copolymer of 2-hydroxyethyl methacrylate with N-vinylpyrrolidone.

Example 1

A contact lens based on a poly (2-hydroxyethyl methacrylate) is provided with an equilibrium water content after swelling of 38 percent by weight and a central thickness of 0.08 mm. This contact lens was prepared by the turning of a xerogel block and then being immersed for 24 hours in a solution containing aprotinin 0.01 g.; and of up to 100 g. ionically balanced borax buffer (pH 7.4). The solution was twice changed. The contact lens extended the period of continuous wearing by 100 percent.

Example 2

A contact lens in xerogel state which is a product of Allergan Optical™ named Polymacon™ (35 percent by weight of equilibrium water having a central thickness of 0.18 mm.) was immersed at ambient temperature for 24 hours in a solution containing aprotinin 0.005 g.; and of up to 100 g. ionically balanced phosphate buffer (pH 7.4). The solution was changed twice. Aprotinin was placed in the contact lens through the solution. The short wearing time of the contact lens which was previously approximately 6 hours was extended to a period of wearing of 12 hours.

Example 3

Contact lenses in xerogel state with a different content of equilibrium water after swelling, produced by CIBA Vision Co.™ under the name Cibasoft™ (35 percent by weight of equilibrium water), AOSOFT™ (Vifilcon A having 55 percent by weight of equilibrium water), SOFTCON™ Aphacic™ (Vifilcon A having 55 percent by weight of equilibrium water), each having a central thickness of 0.12 to 0.20 mm. were dipped for 24 hours in a solution containing 1 g. of aprotinin and up to 100 g. of physiological saline. The solution was changed twice. The wearing periods for contact lenses were extended by 150 percent. The wearing period of the contact lenses was extended for all users including patients suffering from allergic conjunctivitis. The objective and subjective symptoms rapidly receded after application of the contact lens.

Example 4

A contact lens in xerogel state produced by Coast Vision™ which is 55 percent by weight of equilibrium water was dipped for 24 hours into a solution containing 2 g. of aprotinin and up to 100 g. of ionically balanced phosphate buffer (pH 7.4). The treatment extended the period of continuous wearing by 1 week. It was very successfully used in the treatment of scleritis and episcleritis. The healing occurred during 10 days.

Example 4 was further used for the treatment of a cornea burned with alkali and acid. The subjective symptoms relieved after application of the contact lens and healing occurred during a week after the burning with low-concentrated substances. Transparency of the cornea was completely recovered. In the cases of burning etching with highly concentrated solutions, the cornea healed with a scar (the breakdown of the cornea did not occur) and transparency of the cornea was recovered in part.

Example 5

A contact lens in xerogel state made by Contact Lens Co.™ (Deltafilcon having 43 percent by weight of equilibrium water) was dipped for 24 hours into a solution containing 0.001 g. aprotinin and up to 100 g. of physiological saline. The contact lens enabled the repeated short-term wearing (6 to 12 hours) without any subjective or objective symptoms.

Example 6

A contact lens commercially made by Coopervision™ (Polymacon having 38 percent by weight of equilibrium water and a central thickness of 0.15 mm.) was dried for 24 hours at ambient temperature and then immersed for 12 hours into the solution containing 0.1 g. of aprotinin and up to 100 g. of physiologic saline. The wearing period of the contact lens was extended by 150 percent. The lens was also used with great success for the treatment of non-healing erosions of the cornea. The lesions healed during 6 days after application of the lens.

Example 7

A contact lens commercially produced by COOPERTHIN™ (Polymacon having 38 percent by weight of equilibrium water) was dried at ambient temperature for 24 hours and then dipped for 12 hours into the solution containing substantially 2 g. of aprotinin and up to 100 g. of ionically balanced borax buffer. The contact lens enabled the wearing time to be extended from 6 to 24 hours. It was also used for the treatment of xerosis and keratosis of various origins. After application of the lens, healing with the normal epithelium occurred within 6 weeks.

Example 8

A contact lens commercially made by Firestone Optics™ (substantially 55 percent by weight of equilibrium water) was dried at ambient temperature for 24 hours and then dipped for 12 hours into a solution containing 0.05 g. of aprotinin and up to 100 g. of physiological saline. The contact lens in a cosmetic application had the wearing period extended by 100 percent. It was used in the therapy of bullous keratopathy where substantially soothed the subjective symptoms. A substantial improvement occurred also after application of the lens in the treatment of dry eyes.

Example 9

A contact lens commercially made by Flexiens, Inc.™ (Hefilcon A having 45 percent by weight of equilibrium water) was dried at ambient temperature for 24 hours and then dipped into a solution containing substantially 0.1 g. of aprotinin and 0.01 g. of elastatinal, and up to substantially 100 g. of physiological saline. The contact lens was applied in the cases of epithelial defects. The cornea healed within a week. The lens was also used in the treatment of small perforations of the cornea. The small perforations rapidly healed after the application. These lenses healed the eyes burned with weak acids and alkalies within 5 days. Transparency of the cornea was recovered.

Example 10

A contact lens commercially made by Metro Optics, Inc.™ (Polymacon having 38 percent by weight of equilibrium water) was dried at ambient temperature for 24 hours and then dipped for 12 hours into a solution containing 0.5 g. of aprotinin, 0.2 g. of elastatinal, 0.1 g. of soybean, and up to 100 g. of physiological saline.

The contact lens extended its wearing period by 100 percent. It was also used for therapeutic purposes and was very effective in the treatment of eyes burned with concentrated acids and alkalies. The inflammation of the eye receded in the frequency of corneal destruction was substantially reduced. The injury healed with a scar within a month and, in some cases, the transparency of the cornea recovered completely or at least in the periphery.

Example 11

A contact lens of firm Lombart Lenbart Lenses™ (Deltafilcon B having 43 percent by weight of equilibrium water) was dried at ambient temperature and immersed for 12 hours in a solution containing 0.2 g. of aprotinin, 0.1 g. of dexamthasone sodium phosphate, and up to 100 g. of physiological saline.

The contact lens enabled wearing also in cases where the vascularization of the cornea was found already in the preceding period of wearing. The lens prepared in this way inhibited this vascularization. The contact lens was also successfully used in the treatment of corneal infiltrates and the healing occurred within 10 days.

Example 12

A contact lens of firm Metro Optics™ (55 percent by weight of equilibrium water) was dried at ambient temperature for 24 hours and dipped into a solution containing 0.01 g. of aprotinin, 0.1 g. of elastatinal, 0.1 g. of dexamethasone sodium phosphate, 0.5 g. of chloramphenicol, and up to 100 g. of physiological saline. After the application of the lenses to the eye with nonhealing corneal ulcers, healing occurred within 3 to 5 days.

Example 13

A contact lens of the firm Ocu-Ease Optical™ (Ocufilcon having 53 percent by weight of equilibrium water) was dried for 24 hours and then dipped for 24 hours into a solution containing 0.02 g. of aprotinin, 0.2 g. of flurbiprofen, and up to 100 g. of physiological saline. The contact lens enabled the wearing period to be extended by 100 percent. The vascularization of the cornea was never found. The contact lens was also applied with success in the treatment of corneal vascularization developed in the preceding period of wearing. A very fast inhibition of vascularization took place after application of lenses prepared in this way.

Example 14

A contact lens produced by Optical Plastics Research™ (Ocufilcon C having 55 percent by weight of equilibrium water) was dried for 24 hours at ambient temperature and dipped into a solution containing 1 g. of aprotinin, 0.1 g. of flurbiprofen, 0.01 g. of elastatinal, 0.3 g. of chloramphenicol, and up to 100 g. of physiological saline. The contact lens was used in the treatment of both superficial and deep corneal infiltrates. The healing occurred within 1 to 2 weeks. In the cases complicated with the secondary iritis, the symptoms substantially soothed after application of the lens.

Example 15

A contact lens of the firm Pearle Vision™ (55 percent by weight of equilibrium water) was dried at ambient temperature and then dipped for 24 hours into the solution containing 0.02 g. of aprotinin, 0.01 g. of elastatinal, 0.06 g. of soybean, 0.15 g. of dexamethosone sodium phosphate, and up to 100 g. of ionically balanced phosphate buffer (pH 7.4). The contact lens healed inflammatory processes of the cornea with stromal infiltrates.

Example 16

A contact lens made by the firm Omega Optical™ (Polymacon having 38 percent by weight of equilibrium water) was dried to a xerogel state and swelled for 24 hours in the solution containing 1 g. of aprotinin, 0.1 g. of elastatinal, 0.1 g. of flurbiprofen, 0.1 g. of dexamethasone sodium phosphate, 0.3 g. of neomycin sulfate, and up to 100 g. of physiological saline. A contact lens was used for the treatment of nonhealing erosions of the cornea. The reepithelization was sped up within a week after application. Exceptional results were attained after the severe etching and burning of the anterior segment of the eye. An introcular inflammation did not develop and the cornea did not exhibit ulcerization and healed with a scar within a month. The transparency recovered in the periphery of the cornea.

Example 17

A contact lens made by the firm Salvatori Ophthalmics™ (Polymacon having 38 percent by weight of equilibrium water) in a xerogel state was swelled for 24 hours in the solution containing 1 g. of aprotinin, 0.2 g. of pirprofen, 0.3 g. of neomycin sulfate, and up to 100 g. of physiological saline. The contact lens provided the treatment of corneal infiltrates complicated by iritis and iridocyclitis. The inflammatory symptoms receded within 3 weeks.

Example 18

A contact lens made by the firm Sofsite™ in a xerogel state was swelled for 24 hours in a solution containing 0.1 g. of elastatinal, 0.1 g. of aprotinin, 0.15 g. of dexamethosone sodium phosphate, 0.1 g. of flurbiprofen, 0.2 g. of chloramphenicol, and up to 100 g. of physiological saline. The contact lens was used for the treatment of cornea burned with alkalies and lime. Healing ad integrum occurred in some cases. In more severe cases, where the cornea had broken down, the tissue healed with a scar after application of these lenses. In other cases, the contact lens proved very efficient in the healing of corneal ulcers.

Example 19

A contact lens commercially produced by CIBA Vision Co.™ under the name Cibasoft™ (having 37.5 percent by weight of equilibrium water) was dried at ambient temperature for 24 hours and then immersed for 24 hours into a solution containing 0.5 g. aprotinin, 0.3 g. of tetracycline, 0.2 g. elastatinal, and up to 100 g. of physiological saline. The contact lens was used for the treatment of bacterial keratitis. The cornea, afflicted by infection of Staphylococcus pyogenes aureus and Streptococcus beta haemolyticus healed with 10 days.

Example 20

A contact lens commercially produced by CIBA Vision Co.™ under the name AOSOFT™ (Vifilcon A having 55 percent by weight of equilibrium water) was dried at ambient temperature for 24 hours and then dipped for 24 hours into the solution containing 0.1 g. of aprotinin, 10,000 units of bacitracin, 0.5 g. of diclofenac, and up to 100 g. of physiological saline. The contact lens healed the cornea afflicted with the infection of Pseudomonas aeruginosa within 10 days.

Any one of these contact lenses of hydrophilic gels can be stored in a solution of physiological saline, water, or buffer, (here collectively called a physiological liquid) with a pH of substantially 6.5 to 7.5, which contains inhibitors of endoproteases or exoproteases, before application to the eye.

Thus, although there have been described particular embodiments of the present invention of new and useful contact lens of hydrophilic gels, it not intended that such references be construed as limitations upon the scope of this invention except as set forth in the following claims. Further, although there have been described certain parameters used in the preferred embodiment, it is not intended that such parameters be construed as limitations upon the scope of this invention except to set forth in the following claims.

What we claim is:

1. A contact lens consisting essentially of:
   - a hydrophilic gel selected from the group consisting of cross-linked polymers of 2-hydroxyethyl methacrylate and cross-linked copolymers of 2-hydroxyethyl methacrylate, the cross-linked copolymers of 2-hydroxyethyl methacrylate being selected from the group consisting of cross-linked copolymers of 2-hydroxyethyl methacrylate with vinylpyrrolidone and methacrylic acid, cross-linked copolymers of 2-hydroxyethyl methacrylate with methyl methacrylate, cross-linked copolymers of 2-hydroxyethyl methacrylate with methacrylic acid, and cross-linked co-polymers of 2-hydroxyethyl methacrylate with N-vinylpyrrolidone;
   - about 20 to 95 percent by weight of a swelling agent in said gel, when said gel is in an equilibrium swollen state, said agent being a buffer having a pH of 6.5 to 7.5;
   - 0.1 to 20 mg of an inhibitor of endoproteases and exoproteases selected from the group consisting of elastatinal, aprotinin, and soyabean inhibitor of trypsin, per milliliter of said swelling agent;
   - about 0.2 to 1 percent by weight of an antibiotic in said gel, the antibiotic sensitive to microbes and selected from the group consisting of chloroamphenicol, meomycin, bacitracin, and tetracycline; and
   - at least one of an active ingredient selected from the group consisting of a steroidal antiphlogistic in an amount of about 0.05 to 1.5 percent by weight in said gel and a non-steroidal antiphlogistic in an amount of about 0.05 to 5 percent by weight in said gel.

\* \* \* \* \*